United States Patent
Loehr et al.

(10) Patent No.: US 10,548,183 B2
(45) Date of Patent: *Jan. 28, 2020

(54) DISCONTINUOUS RECEPTION OPERATION FOR LICENSED-ASSISTED ACCESS

(71) Applicant: Panasonic Intellectual Property Corporation of America, Torrance, CA (US)

(72) Inventors: Joachim Loehr, Hessen (DE); Prateek Basu Mallick, Hessen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,380

(22) Filed: Aug. 28, 2019

(65) Prior Publication Data

US 2019/0387573 A1 Dec. 19, 2019

Related U.S. Application Data

(63) Continuation of application No. 16/370,361, filed on Mar. 29, 2019, which is a continuation of application (Continued)

(30) Foreign Application Priority Data

Apr. 10, 2015 (EP) .................................... 15163257

(51) Int. Cl.
*H04W 76/28* (2018.01)
*H04W 72/04* (2009.01)
*H04W 16/14* (2009.01)

(52) U.S. Cl.
CPC ......... *H04W 76/28* (2018.02); *H04W 72/042* (2013.01); *H04W 72/0446* (2013.01); *H04W 16/14* (2013.01); *H04W 72/0453* (2013.01)

(58) Field of Classification Search
CPC . H04W 16/14; H04W 72/042; H04W 76/048; H04W 76/28; H04W 16/24;
(Continued)

(56) References Cited

U.S. PATENT DOCUMENTS

2012/0188903 A1 7/2012 Futaki
2013/0201884 A1 8/2013 Freda et al.
(Continued)

FOREIGN PATENT DOCUMENTS

JP 2011-259106 A 12/2011
WO 2014/088295 A1 6/2014

OTHER PUBLICATIONS

3GPP TS 36.211, V12.5.0, "3rd Generation Partnership Project; Technical Specification Group Radio Access Network; Evolved Universal Terrestrial Radio Access (E-UTRA); Physical channels and modulation (Release 12)", Mar. 26, J015.
(Continued)

*Primary Examiner* — Ajibola A Akinyemi
(74) *Attorney, Agent, or Firm* — Seed IP Law Group LLP

(57) ABSTRACT

The present disclosure relates to a method for operating a Discontinuous Reception, DRX, function at a user equipment. The UE is configured with at least one licensed cell and at least one unlicensed cell and operates the DRX function. The UE receives, from a radio base station, a DRX-active instruction to be in DRX Active Time at least on the unlicensed cell until receiving the next downlink control information related to a downlink data transmission to be received via the unlicensed cell. Correspondingly, in response to the received DRX-active instruction, the UE is
(Continued)

in DRX Active Time at least on the unlicensed cell, comprising continuously monitoring a downlink control channel for downlink control information.

4 Claims, 12 Drawing Sheets

Related U.S. Application Data

No. 15/670,714, filed on Aug. 7, 2017, now Pat. No. 10,292,202, which is a continuation of application No. PCT/JP2016/001190, filed on Mar. 4, 2016.

(58) Field of Classification Search
CPC ............. H04W 28/12; H04W 72/0446; H04W 72/1289; H04W 74/006; H04W 74/0808
USPC ........................................................ 455/282
See application file for complete search history.

(56) References Cited

U.S. PATENT DOCUMENTS

| | | |
|---|---|---|
| 2014/0247742 A1 | 9/2014 | Lee et al. |
| 2015/0085841 A1 | 3/2015 | Sadek |
| 2015/0327325 A1* | 11/2015 | Koivisto ................. H04L 5/005 370/350 |
| 2016/0095048 A1* | 3/2016 | Nory ...................... H04W 24/08 370/252 |
| 2017/0331610 A1* | 11/2017 | Miao ..................... H04W 56/00 |

OTHER PUBLICATIONS

3GPP TS 36.212, V12.4.0, "3rd Generation Partnership Project; Technical Specification Group Radio Access Network; Evolved Universal Terrestrial Radio Access (E-UTRA); Multiplexing and channel coding (Release 12)", Mar. 26, 2015.

3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.

3GPP TS 36.321, V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 27, 2015.

Alcatel-Lucent, Alcatel-Lucent Shanghai Bell, Coolpad, Ericsson, ETRI, Huawei, HiSilicon, IAESI, InterDigital, LG, Nokia Corporation, Nokia Networks, Qualcomm, NTT Docomo, Panasonic, Samsung, TI, Verizon Wireless, ZTE, "Regulatory Requirements for Unlicensed Spectrum," R1-144348, 3GPP TSG RAN WG1 Meeting #78bis, Oct. 6, 2014.

ETRI, "LAA using LTE deployment and operational scenarios" R1-143965, 3GPP TSG RAN WG1 Meeting #78bis, Sep. 27, 2014.

ETSI EN 301 893, V1.8.0, "Broadband Radio Access Networks (BRAN); 5 GHz high performance RLAN; Harmonized EN covering the essential requirements of article 3.2 of the R&TTE Directive", Jan. 2015.

International Search Report of PCT application No. PCT/JP2016/001190 dated Apr. 5, 2016.

Motorola Mobility, "Activation and Deactivation of LAA SCells," , R2-150474, 3GPP TSG-RAN WG2#89, Feb. 8, 2015.

Nokia Corporation, Nokia Networks, "Overview of possible LAA impact to RAN2," R2-150188, 3GPP TSG-RAN WG2 Meeting #89, Feb. 8, 2015.

RAN2 Chairman (Ericsson), Chairman Notes, 3GPP TSG RAN WG2 #89, Feb. 13, 2015.

Sesia et al. (Ed), *LTE | The UMTS Long Term Evolution—From Theory to Practice*, Hoboken, New Jersey, Chapter 9.3, Baker et al., "Downlink Control Channels," Wiley, pp. 196-214, 2011.

\* cited by examiner

DISCONTINUOUS RECEPTION OPERATION FOR LICENSED-ASSISTED ACCESS

BACKGROUND

Technical Field

The present disclosure relates to methods for operating a Discontinuous Reception, DRX, function at a user equipment, wherein the user equipment is configured with at least one licensed cell and at least one unlicensed cell. The present disclosure also provides the user equipment and base station for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $N^{min,DL}{}_{RB} \leq N^{DL}{}_{RB} \leq N^{max,DL}{}_{RB}$, where $N^{min,DL}{}_{RB}=6$ and $N^{max,DL}{}_{RB}=110$ are respectively the smallest and the largest downlink bandwidths, supported by the current version of the specification. $N^{RB}{}_{SC}$ is the number of subcarriers within one resource block. For normal cyclic prefix subframe structure, $N^{RB}{}_{SC}=12$ and $N^{DL}{}_{symb}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)" version 12.5.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment, the number of component carriers and the bandwidth of each component carrier in uplink and downlink are the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink, there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:
For each SCell, the usage of uplink resources by the UE in addition to the downlink ones is configurable (the number of DL SCCs configured is therefore always larger or equal to the number of UL SCCs, and no SCell can be configured for usage of uplink resources only)
The downlink PCell cannot be de-activated, unlike SCells
Re-establishment is triggered when the downlink PCell experiences Rayleigh fading (RLF), not when downlink SCells experience RLF
Non-access stratum information is taken from the downlink PCell
PCell can only be changed with handover procedure (i.e., with security key change and RACH procedure)
PCell is used for transmission of PUCCH
The uplink PCell is used for transmission of Layer 1 uplink control information
From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation, there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 1/Layer 2 Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even be dynamic for each user. Generally, the L1/2 control signaling needs only to be transmitted once per TTI. Without loss of generality, the following assumes that a TTI is equivalent to one subframe.

The L1/L2 control signaling is transmitted on the Physical Downlink Control Channel (PDCCH).

A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Furthermore, Release 11 introduced an EPDCCH that fulfills basically the same function as the PDCCH, i.e., conveys L1/L2 control signaling, even though the detailed transmission methods are different from the PDCCH. Further details can be found particularly in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;
Resource allocation information, indicating the resources (e.g., Resource Blocks, RBs) on which a user is allocated. Alternatively this information is termed resource block assignment (RBA). Note, that the number of RBs on which a user is allocated can be dynamic;
Carrier indicator, which is used if a control channel transmitted on a first carrier assigns resources that concern a second carrier, i.e., resources on a second carrier or resources related to a second carrier; (cross carrier scheduling);
Modulation and coding scheme that determines the employed modulation scheme and coding rate;
HARQ information, such as a new data indicator (NDI) and/or a redundancy version (RV) that is particularly useful in retransmissions of data packets or parts thereof;
Power control commands to adjust the transmit power of the assigned uplink data or control information transmission;
Reference signal information such as the applied cyclic shift and/or orthogonal cover code index, which are to be employed for transmission or reception of reference signals related to the assignment;
Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v12.4.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignment for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports, two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10).

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

DRX—Discontinuous Reception

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe. DRX functionality can be also configured for an "RRC CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321, "Evolved Universal Terrestrial Radio Access (E-UTRA); Medium Access Control (MAC) protocol specification" version 12.5.0, chapter 5.7 explains the DRX and is incorporated by reference herein.

The following parameters are available to define the DRX UE behavior; i.e., the On-Duration periods at which the mobile node is active (i.e., in DRX Active Time), and the periods where the mobile node is in DRX (i.e., not in DRX Active Time).

On-duration: duration in downlink subframes, i.e., more in particular in subframes with PDCCH (also referred to as PDCCH subframe), that the user equipment, after waking up from DRX, receives and monitors the PDCCH. It should be noted here that throughout this present disclosure the term "PDCCH" refers to the PDCCH, EPDCCH (in subframes when configured) or, for a relay node with R-PDCCH configured and not suspended, to the R-PDCCH. If the user equipment successfully decodes a PDCCH, the user equipment stays awake/active and starts the inactivity timer; [1-200 subframes; 16 steps: 1-6, 10-60, 80, 100, 200]

DRX inactivity timer: duration in downlink subframes that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560] DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on-duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer: specifies the number of consecutive subframes the UE follows the short DRX cycle after the DRX Inactivity Timer has expired. This parameter is optional. [1-16 subframes]

Long DRX Cycle Start offset: specifies the periodic repetition of the on-duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time" or DRX Active Time. The Active Time, e.g., includes the on-duration of the DRX cycle, the time UE is performing continuous reception while the inactivity timer has not expired and the time UE is performing continuous reception while waiting for a downlink retransmission after one HARQ RTT. Similarly, for the uplink the UE is awake (i.e., in DRX Active Time) at subframes where uplink retransmission grants can be received, i.e., every 8 ms after an initial uplink transmission until the maximum number of retransmissions is reached. Based on the above, the minimum Active Time is of fixed length equal to on-duration, and the maximum is variable depending on, e.g., the PDCCH activity.

The "DRX period" is the duration of downlink subframes during which a UE can skip reception of downlink channels for battery saving purposes. The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed at some other time, e.g., during the DRX opportunity time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e., only the long DRX cycle could be used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time, the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to the On-Duration subframes.

Available DRX values are controlled by the network and start from non-DRX up to x seconds. Value x may be any value as long as the paging DRX is used in RRC_IDLE. Measurement requirements and reporting criteria can differ according to the length of the DRX interval, i.e., long DRX intervals may have more relaxed requirements (for more details see further below). When DRX is configured, periodic CQI reports can only be sent by the UE during "active-time". RRC can further restrict periodic CQI reports so that they are only sent during the on-duration.

FIG. 3 discloses an example of an DRX operation. The UE checks for scheduling messages (e.g., indicated by its C-RNTI, cell radio network temporary identity, on the PDCCH) during the "on-duration" period, which is the same for the long DRX cycle and the short DRX cycle. When a scheduling message is received during an "on-duration period", the UE starts an "inactivity timer" and keeps monitoring the PDCCH in every subframe while the Inactivity Timer is running. During this period, the UE can be regarded as being in a "continuous reception mode". Whenever a scheduling message is received while the Inactivity Timer is running, the UE restarts the Inactivity Timer, and when it expires, the UE moves into a short DRX cycle and starts a "short DRX cycle timer" (assuming a short DRX cycle is configured). When the short DRX cycle timer expires, the UE moves into a long DRX cycle. The short DRX cycle may also be initiated by means of a DRX MAC Control Element, which the eNB can send at any time to put the UE immediately into a DRX cycle, i.e., the short DRX cycle (if so configured) or long DRX cycle (in case the short DRX cycle is not configured).

In 3GPP Release 11 a new DRX MAC control element, called Long DRX Command MAC CE, was introduced which allows the eNB to order the UE to go immediately into the Long DRX cycle—without cycling first through the short DRX cycle—for the case that the short DRX cycle is configured.

In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

The above-mentioned DRX-related timers, like the DRX-Inactivity timer, the HARQ RTT timer, the DRX retransmission timer, and the Short DRX cycle timer, are started and stopped by events such as the reception of a PDCCH grant or a MAC control element (DRX MAC CE). Hence, the DRX status (active time or non-active time) of the UE can change from subframe to subframe and thus is not always predictable by the mobile node.

At present, for carrier aggregation, a common DRX operation is applied to all configured and activated serving cells of a UE; this is also referred to as UE-specific DRX. Essentially, the Active Time is the same for all cells. Hence, the UE is monitoring PDCCH of all DL Cells in the same subframe. DRX-related timers and parameters are configured per UE, not per cell, such that there is only one DRX cycle per user equipment. All aggregated component carriers follow this "common" DRX pattern.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers). This includes that a common DRX scheme is used for LAA, particularly if it does not result in a need for very short DRX cycles/very long Active Times. As with carrier aggregation mentioned above, "common DRX" scheme in this respect means that the UE operates the same DRX for all aggregated and activated cells, including unlicensed and licensed cells. Consequently, the Active Time is the same for all serving cells, e.g., UE is monitoring PDCCH of all downlink serving cells in the same subframe; the DRX-related timers and parameters are configured per UE.

A very basic scenario is illustrated in FIG. 4, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed during RAN1#78bis that the LAA investigation at 3GPP will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which depend on a region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1#78bis, September 2014, incorporated herein by reference. Depending on a region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum, and hence it is considered to be a vital feature for fair and friendly operation in the unlicensed spectrum in a single global solution framework.

In an unlicensed spectrum, channel availability cannot always be guaranteed. In addition, certain regions such as Europe and Japan prohibit continuous transmission and impose limits on the maximum duration of a transmission burst in the unlicensed spectrum. Hence, discontinuous transmission with limited maximum transmission duration is a required functionality for LAA.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5-GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.0, incorporated herein by reference.

Following this European regulation regarding LBT, devices have to perform a Clear Channel Assessment (CCA) before occupying the radio channel with a data transmission. It is only allowed to initiate a transmission on the unlicensed channel after detecting the channel as free based, e.g., on energy detection. In particular, the equipment has to observe the channel for a certain minimum time (e.g., for Europe 20 µs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 5, the figure being taken from ETSI EN 301 893 (there FIG. 2: "Example of timing for Frame Based Equipment").

Considering the different regulatory requirements, it is apparent that the LTE specification for operation in unlicensed bands will require several changes compared to the current Rel-12 specification that is limited to licensed band operation. The currently-defined DRX operation can have several disadvantages when being applied by UEs having an aggregated unlicensed cell.

BRIEF SUMMARY

One non-limiting and exemplary embodiment provides an improved method for operating a Discontinuous Reception, DRX, function at a user equipment, which is configured with at least one unlicensed cell.

In one general aspect, the techniques disclosed here feature a method for operating a Discontinuous Reception, DRX, function at a user equipment. The user equipment is configured with at least one licensed cell and at least one unlicensed cell and operates the DRX function. The method includes receiving by the user equipment, from a radio base station, a DRX-active instruction to be in DRX Active Time at least on the unlicensed cell until receiving the next downlink control information related to a downlink data transmission to be received via the unlicensed cell. In response to the received DRX-active instruction, the user equipment is in DRX Active Time at least on the unlicensed cell, comprising continuously monitoring a downlink control channel for downlink control information.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
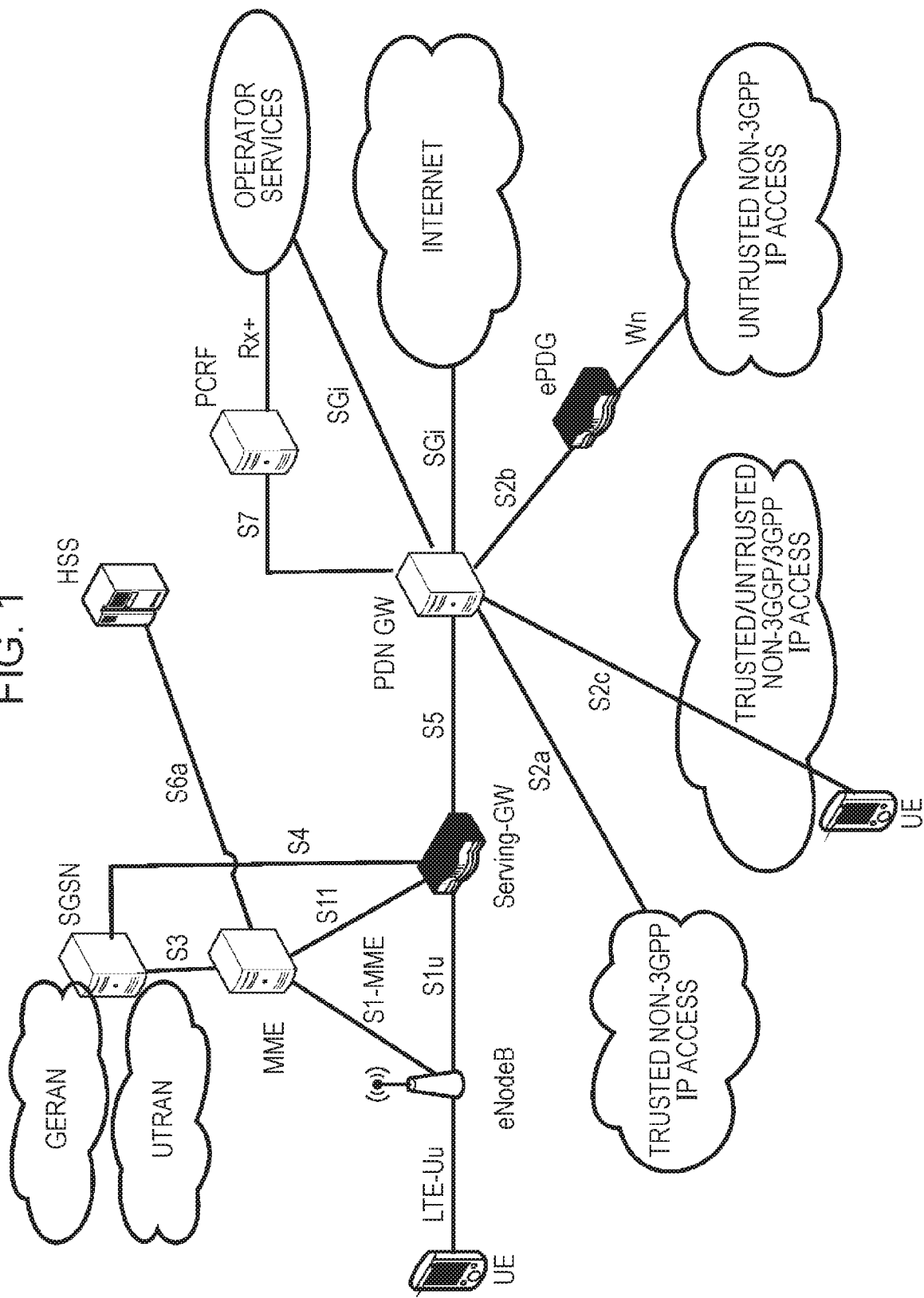
FIG. 1 shows an exemplary architecture of a 3GPP LTE system.
Figure 2:
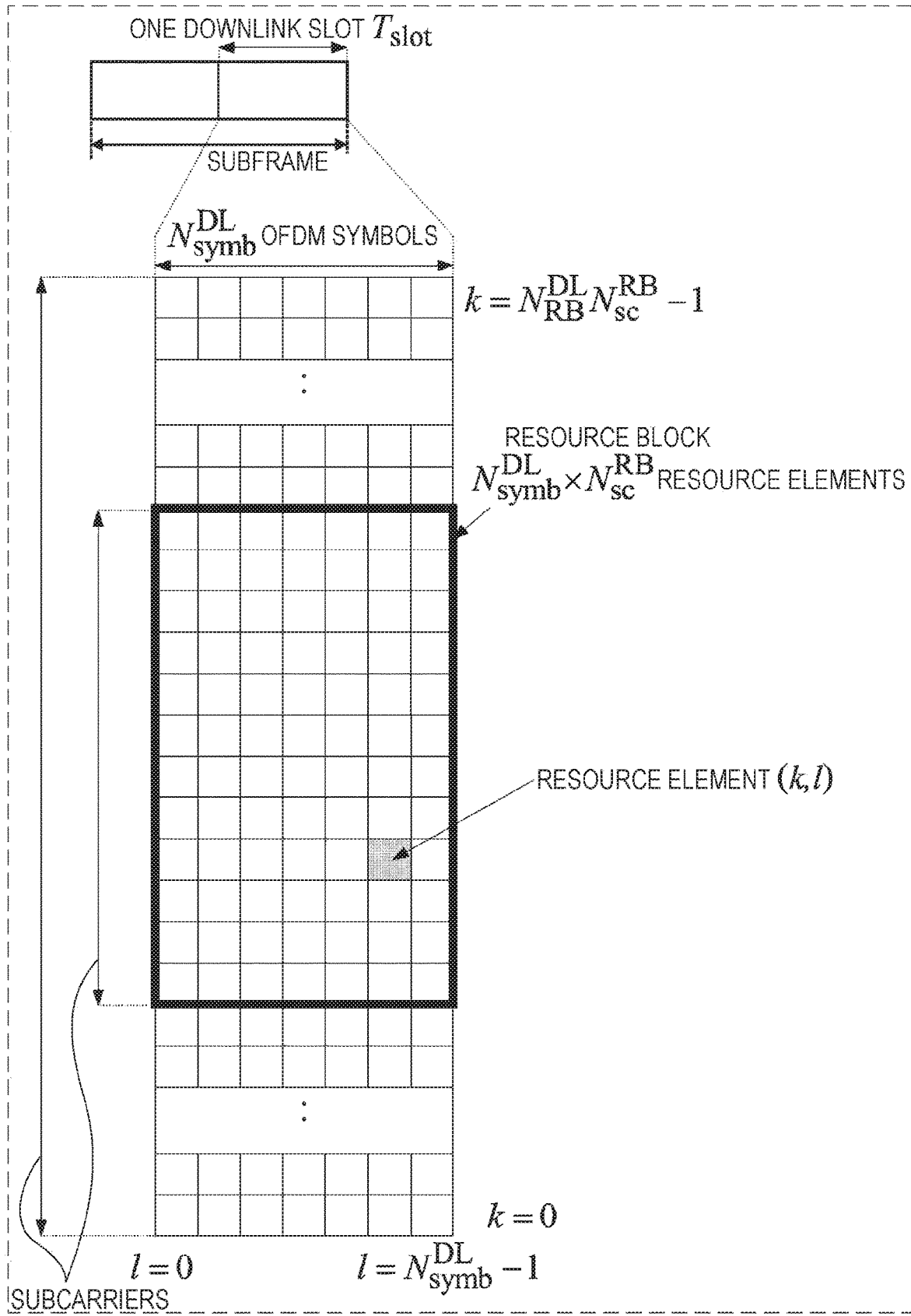
FIG. 2 shows an exemplary downlink resource grid of a downlink slot of a subframe as defined for 3GPP LTE (Release 8/9)
Figure 3:
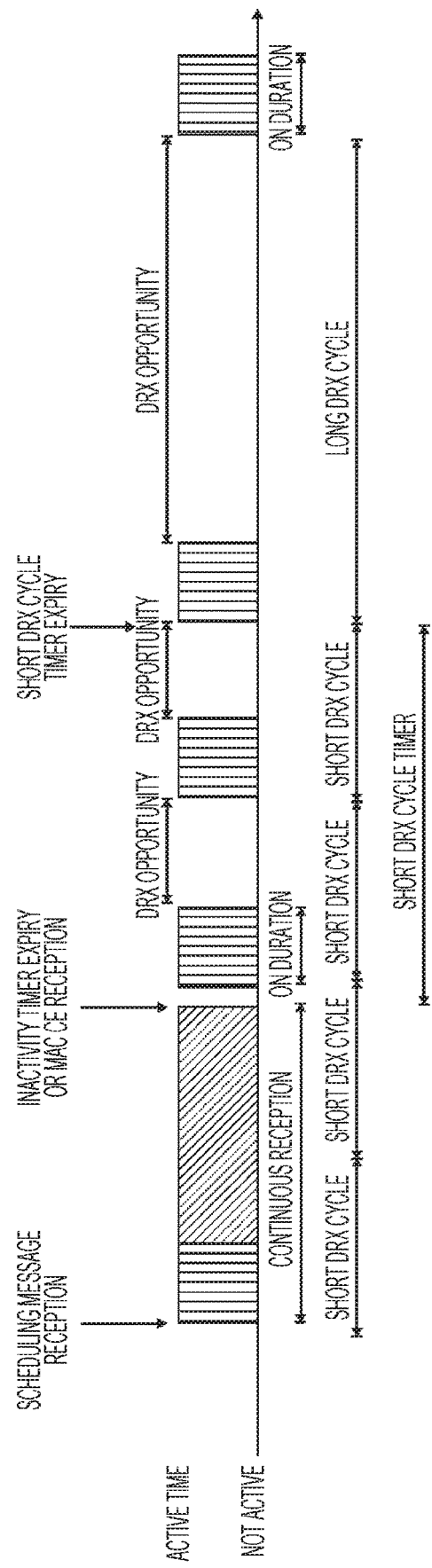
FIG. 3 illustrates the DRX operation of a mobile terminal, and in particular the DRX opportunity and on-duration periods, according to a short and long DRX cycle.
Figure 4:
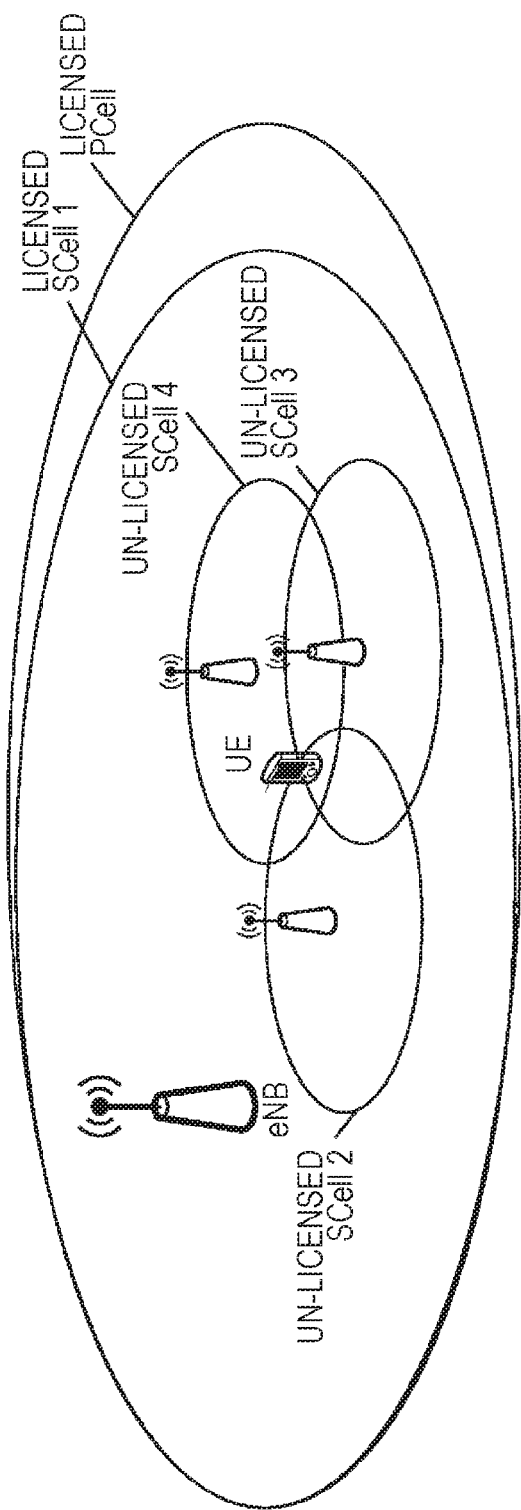
FIG. 4 illustrates an exemplary licensed-assisted access scenario, with various licensed and unlicensed cells.
Figure 5:
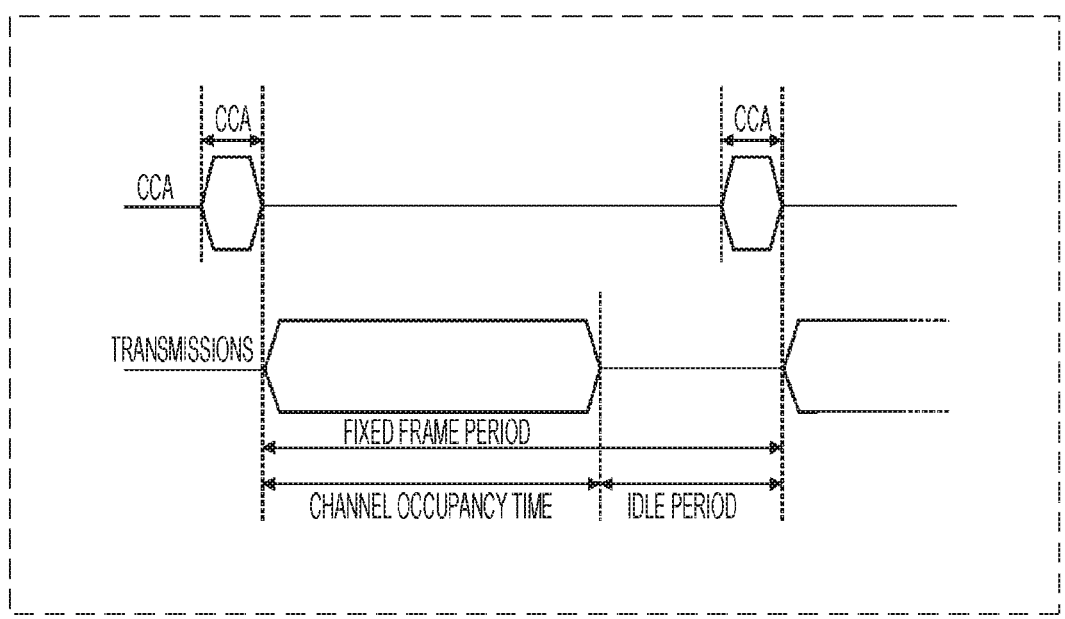
FIG. 5 illustrates schematically the transmission timing on an unlicensed band, including the different periods, Channel Occupancy Time, Idle Period, and Fixed Frame Period.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier in an unlicensed frequency band. Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

The expression "be in DRX Active Time" as used in the set of claims and in the application is to be understood broadly as a subframe where the mobile station monitors the physical control channel like PDCCH or EPDCCH for downlink control information (DCI). Upon detection of downlink control information certain actions are performed by the mobile terminal, e.g., as described in the background section. Correspondingly the term "to be not in DRX Active Time" as used in the set of claims and in the application is to be understood broadly as a subframe where the mobile station is not required to monitor the physical control channel like PDCCH or EPDCCH for downlink control information (DCI).

As discussed in the background section, the LTE specification for operation in unlicensed bands will require several changes compared to the current Release-12 specification for licensed band operation. The co-existence with WiFi on unlicensed bands at 5 GHz is one of the most critical topics. As stipulated by the European Regulation Requirements, nodes operating on unlicensed bands are to perform Listen-Before-Talk before accessing the channel, which is based, e.g., on the reception power level at the node over the whole frequency band.

As explained in the background section, 3GPP agreed so far that a common DRX operation for all aggregated and activated cells is assumed for a UE also in case of unlicensed cells, so as to reuse existing mechanism as applied to the usual carrier aggregation. In particular, the same DRX operations apply to all serving cells, including an identical DRX Active Time during which the PDCCHs of the various cells are monitored. It should be noted that throughout this present disclosure the term "PDCCH" refers to the PDCCH, EPDCCH (in subframes when configured) or, for a relay node with R-PDCCH configured and not suspended, to the R-PDCCH.

However, there are several differences between DRX for carrier aggregation as already known and DRX applied in an LAA scenario. For one thing, due to having to perform LBT/CCA before transmitting on an unlicensed cell, there is no guarantee that the channel on the unlicensed cell is actually obtained for performing the transmission. Furthermore, regulatory requirements restrict the time of a continuous transmission to a maximum Channel occupancy time, such that, even if the channel is determined by the CCA to be free, the transmitter (in this case the radio base station, eNodeB) can only be occupying the channel for a limited amount of time.

Figure 6:
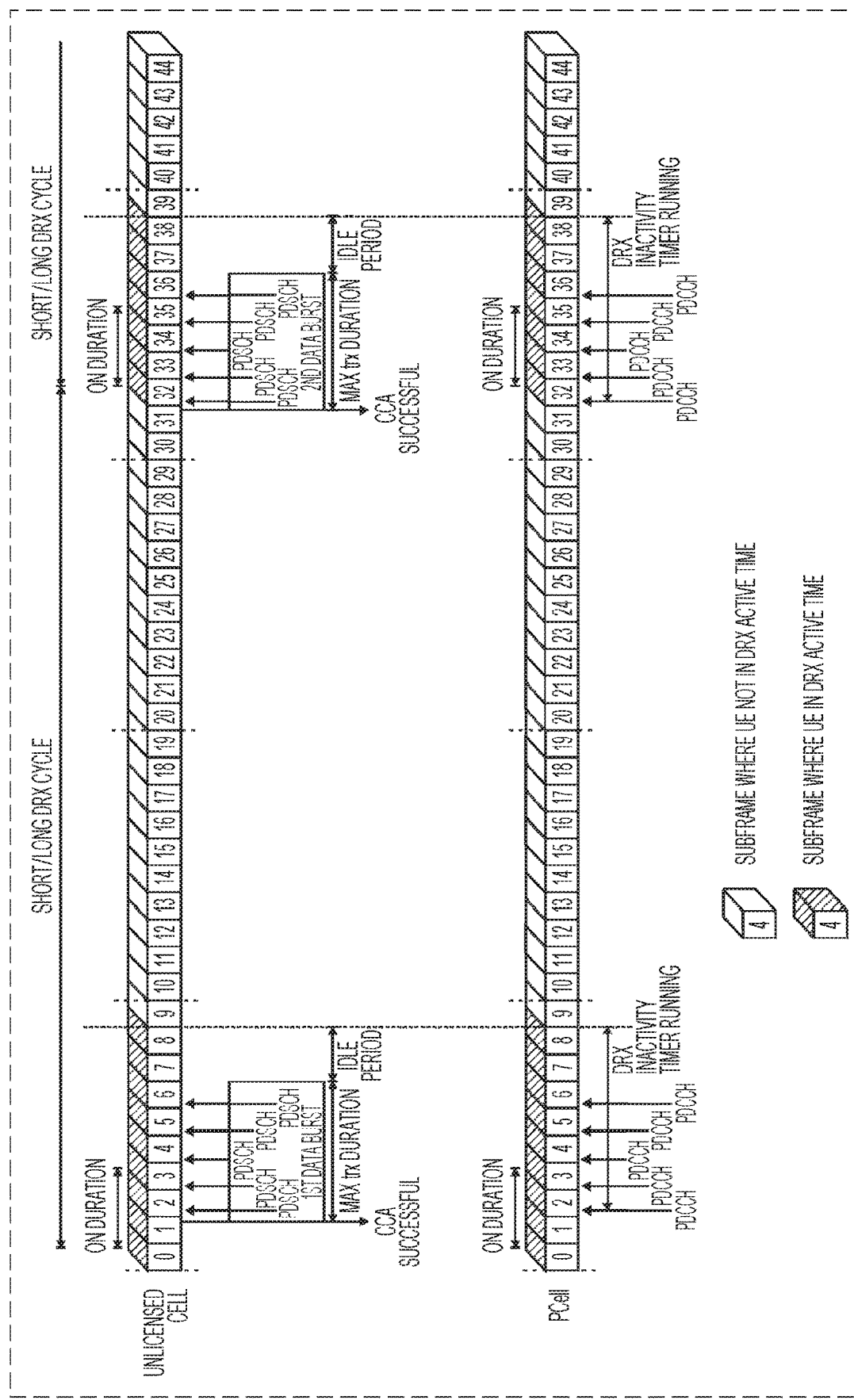
FIG. 6 illustrates schematically the DRX operation for an exemplary scenario with one unlicensed cell, and the timing of corresponding downlink transmissions via the unlicensed cell.

FIG. 6 illustrates the DRX operation with two serving cells (PCell and one unlicensed cell) as well as data downlink transmissions (PDSCH) and the corresponding downlink control information (PDCCH). FIG. 6 furthermore illustrates in which subframes the UE is in DRX Active Time and in which the UE is not. In the exemplary scenario of FIG. 6, cross scheduling from the PCell is assumed, i.e., downlink control information (for downlink and uplink) relating to the unlicensed cell is received via the PCell instead of the unlicensed cell itself (which could be termed self scheduling). For illustration purposes only, the DRX On-Duration period is assumed to be 3 subframes long, the Short or Long DRX cycle to be 32 subframes long, the DRX Inactivity Timer to expire within 2 subframes, the maximum Channel Occupancy Time (termed "Max trx duration" in FIG. 6) to be 5 ms (subframes), and the Idle Period to be 2 ms (subframes).

A further assumption to facilitate explanation of the underlying technical problems to be solved by the various embodiments is that the UE is not in DRX Active Time for other reasons, e.g., HARQ RTT timer running or SR on PUCCH has been sent. In other words, the other available conditions (e.g., HARQ RTT timer, mac-ContentionResolutionTimer, SR pending, UL grant, etc.) due to which a UE can be in DRX Active Time are ignored, and focus is put on the DRX Inactivity Timer.

The eNB can only perform a downlink transmission via an unlicensed cell in those subframes during which the UE monitors the corresponding PDCCH which is received via the PCell. In other words, in order for the UE to be able to receive a downlink transmission from the eNodeB, the UE must be in DRX Active Time (at least on the unlicensed cell and the scheduling cell, PCell) so as to monitor the corresponding downlink control channel. For example, the UE would monitor the PDCCH on the PCell during subframes of the DRX On-Duration period, and the eNB could correspondingly transmit a PDCCH, PDSCH in one of said subframes of the DRX On-Duration period (in FIG. 6, subframe 2 of the first depicted radio frame). It is assumed that the channel of the unlicensed cell is not occupied, such that an LBT/CCA performed by the eNodeB in a timely manner before initiating the transmission is successful. Upon successfully decoding the first PDCCH, the corresponding DRX Inactivity Timer would be running, and restarted upon every new successful decoding of a PDCCH.

The eNB could transmit data in 5 consecutive subframes (i.e., maximum channel occupancy time); termed 1st data burst in FIG. 6. The corresponding DRX Inactivity Timer would be running 2 subframes longer, i.e., until subframe 8, such that the UE would still be in DRX Active Time until subframe 8, with subframe 9 being the first subframe where the UE is not in DRX Active Time. However, the idle period of 2 ms for the unlicensed cell after the end of the 1st data burst prevents the eNB to (do the LBT/CCA and to) transmit again before subframe 9. Consequently, the eNB has to wait until the next time where the UE is in DRX Active Time, which is the first subframe of the next On-Duration period (in this case beginning with subframe 32). Again, assuming the LBT/CCA to be successfully performed by the eNodeB, a second data burst, including corresponding downlink control information (PDCCH) and data transmission (PDSCH), can be performed in 5 consecutive subframes, subframes 32-36. Such a transmission mechanism is then performed repetitively.

As can be appreciated from the above description, such a data transmission is rather inefficient and may take a long time to be completed not only due to the short time possible for the data bursts on unlicensed cells but also due to the few downlink opportunities available during normal DRX operation. This is further exacerbated assuming that the frequency band of the unlicensed cell is also used by a WLAN node, in which case the LBT/CCA performed by the eNodeB would not the successful many times.

The described problem depends also on the particular parameters chosen for the DRX function. By choosing short DRX cycles and long DRX Active Time periods for a UE with (at least one) unlicensed cell, the problem is mitigated since the eNB will get more opportunities to try performing a downlink transmission (including performing LBT/CCA). However, this comes at the cost of expending a lot of power.

The following exemplary embodiments are conceived by the inventors to mitigate the problems explained above.

Some of these are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure and its embodiments as such.

According to one embodiment which solves the above described problem, a PDCCH is repetitively transmitted from the eNB (for example on the PCell, being the scheduling cell of the unlicensed cell) so as to keep the UE in DRX Active Time as long as necessary to allow the eNB to initiate the next downlink transmission on the unlicensed cell. This embodiment will be explained in connection with FIG. 7, which illustrates the DRX operation and downlink transmission for two cells (a PCell, and one unlicensed serving cell, e.g., SCell) with which a UE is configured. A similar scenario as for FIG. 6 is assumed, additionally illustrating the various additional PDCCHs and the corresponding additional subframes the UE is in DRX Active Time.

In particular, so as to achieve that the UE is in DRX Active Time (i.e., monitors for PDCCHs) when the eNB schedules the next downlink transmission on the unlicensed cell (assuming CCA was successful), the DRX Inactivity Timer is periodically restarted (in a timely manner before its expiry) by transmitting corresponding PDCCHs in the downlink (for example via the PCell). It should be noted that these additional PDCCHs needed not refer to the unlicensed cell (although they could), but can refer (as in this exemplary case) to a downlink transmission on the PCell itself. Since common DRX operation on all cells is assumed, the PDCCH on the PCell achieves that the DRX Active Time in both PCell and the unlicensed cell continues. The time period in which the UE is in DRX Active Time can thus be extended as long as the eNB deems it necessary.

Figure 7:
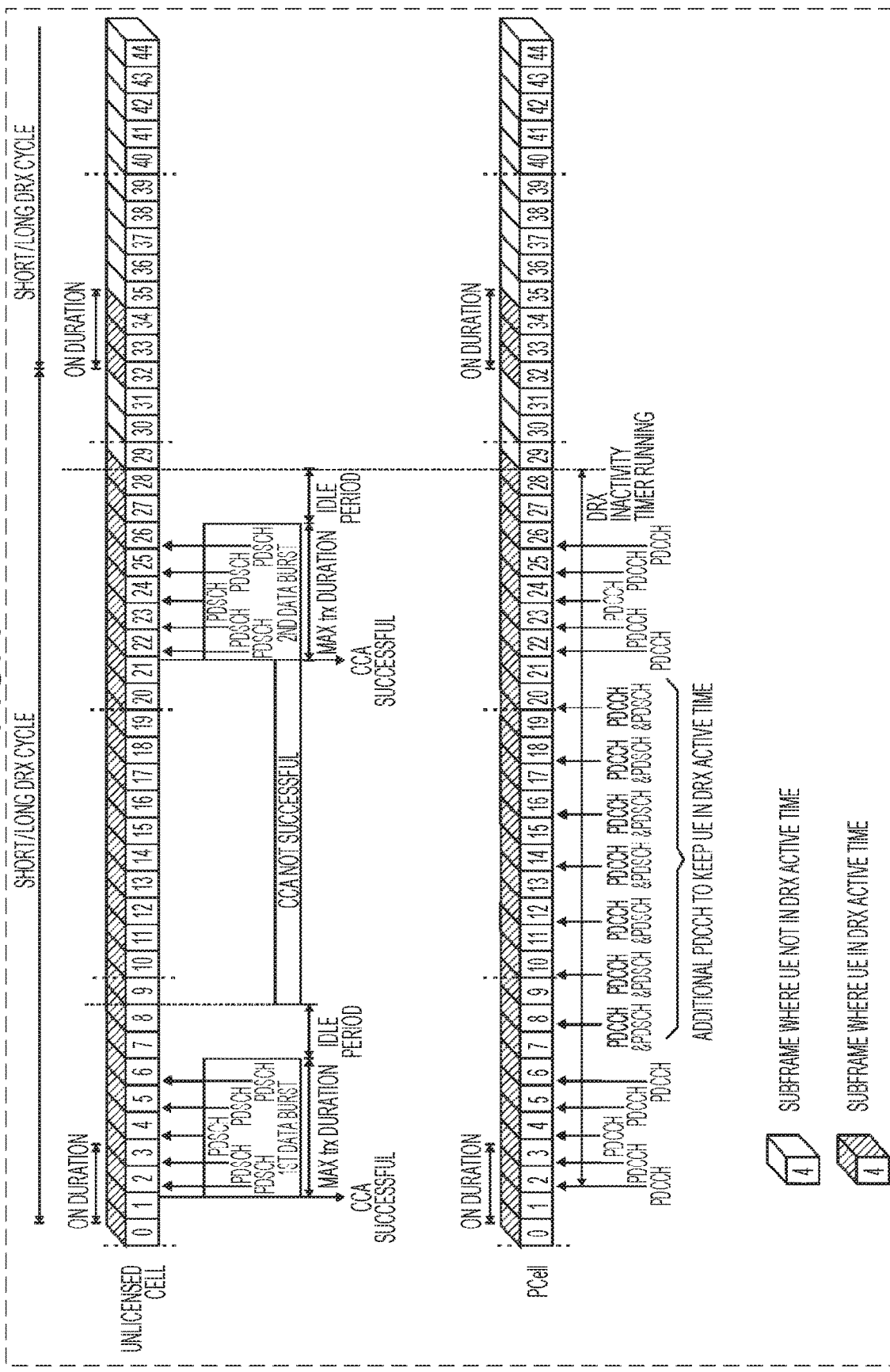
FIG. 7 illustrates schematically an enhanced DRX operation and the timing of corresponding downlink transmissions via the unlicensed cell according to one embodiment.

As illustrated in FIG. 7, after receiving the last PDCCH/PDSCH for the first data burst in subframe 6, the first additional PDCCH can be transmitted in subframe 8, i.e., before expiry of the DRX Inactivity timer (2 subframes after the last PDCCH reception in subframe 6). In this exemplary scenario, it is assumed that the additional PDCCH schedules a PDSCH transmission on the PCell, as illustrated in FIG. 7.

The additional PDCCH prevents the DRX Inactivity timer to expire and the corresponding subframes 9 and 10 will be part of the DRX Active Time for the UE as well. It is assumed for the exemplary scenario of FIG. 7 that the eNodeB performs the LBT/CCA periodically after the end of the idle period, i.e., as of subframe 9, however, it is further assumed that the LBT/CCA is not successful, i.e., that the channel is occupied and not usable for the eNodeB to perform the second data burst yet.

Correspondingly, in order to keep the UE further in DRX Active Time until the CCA is successful, additional PDCCHs are transmitted so as to keep the DRX Inactivity Timer running, the next PDCCH being transmitted in subframe 10, then in subframes 12, 14, 16, 18, and 20. It is then assumed that LBT/CCA is performed successfully in subframe 21 (e.g., a WLAN node finished a transmission), such that the second data burst can be performed in corresponding subframes 22-26 (in 5 continuous subframes, limited by the maximum channel occupancy time).

However, depending on the length of the Idle Time, the DRX Inactivity Timer, and unlicensed channel occupation, quite a significant number of PDCCHs needs to be sent to keep the UE in DRX Active Time. This will consequently increase the signaling overhead (PDCCH/PDSCH) and reduce the PDCCH capacity. Furthermore, each of the additional PDCCHs would schedule a corresponding downlink or uplink transmission (i.e., PDSCH, PUSCH) with either dummy data (if, e.g., no uplink or downlink data is available for transmission) or with data actually pending for transmission (e.g., part of the downlink data to be transmitted via the unlicensed cell), which would then be transmitted via the PCell. Even if as few data as possible is scheduled, the PDSCH/PUSCH capacity of the PCell would still be reduced. It should be noted that (unlicensed) serving cells shall offload data from the PCell, which would not be the case here anymore.

Another embodiment which solves the above described problem is that the UE is in DRX Active Time in all subframes in which the unlicensed cell is activated. Put differently, all subframes where the unlicensed cell is activated are part of the DRX Active Time where the UE continuously monitors for PDCCHs (e.g., on the PCell). This has the advantage that it does not require any signaling (e.g., the previously-mentioned additional PDCCH(s) of FIG. 7) to keep the mobile in DRX Active Time, as this is done implicitly based on the activation and deactivation status of the unlicensed cell. When assuming a common DRX for all aggregated and configured cells of the UE, this basically means that the UE is in DRX Active Time in all subframes of all aggregated cells where at least one unlicensed cell is activated.

This might not be very efficient from the perspective of UE power saving, but this disadvantage may be mitigated by correspondingly deactivating and activating the unlicensed cell as necessary, which will be described in the following. Cell deactivation and activation is possible for example by use of a corresponding Activation/Deactivation MAC Control Element as defined in subclause 6.1.3.8 of 3GPP TS 36.321 v12.5.0, incorporated herein by reference. Of course, the instruction to deactivate and activate a cell could be implemented differently. Correspondingly, an eNB can use this MAC CE to activate and deactivate the unlicensed cell in a suitable manner to save power while still being able to assure that the UE is continuously in DRX Active Time when downlink data is to be transmitted via the unlicensed cell.

Figure 8:
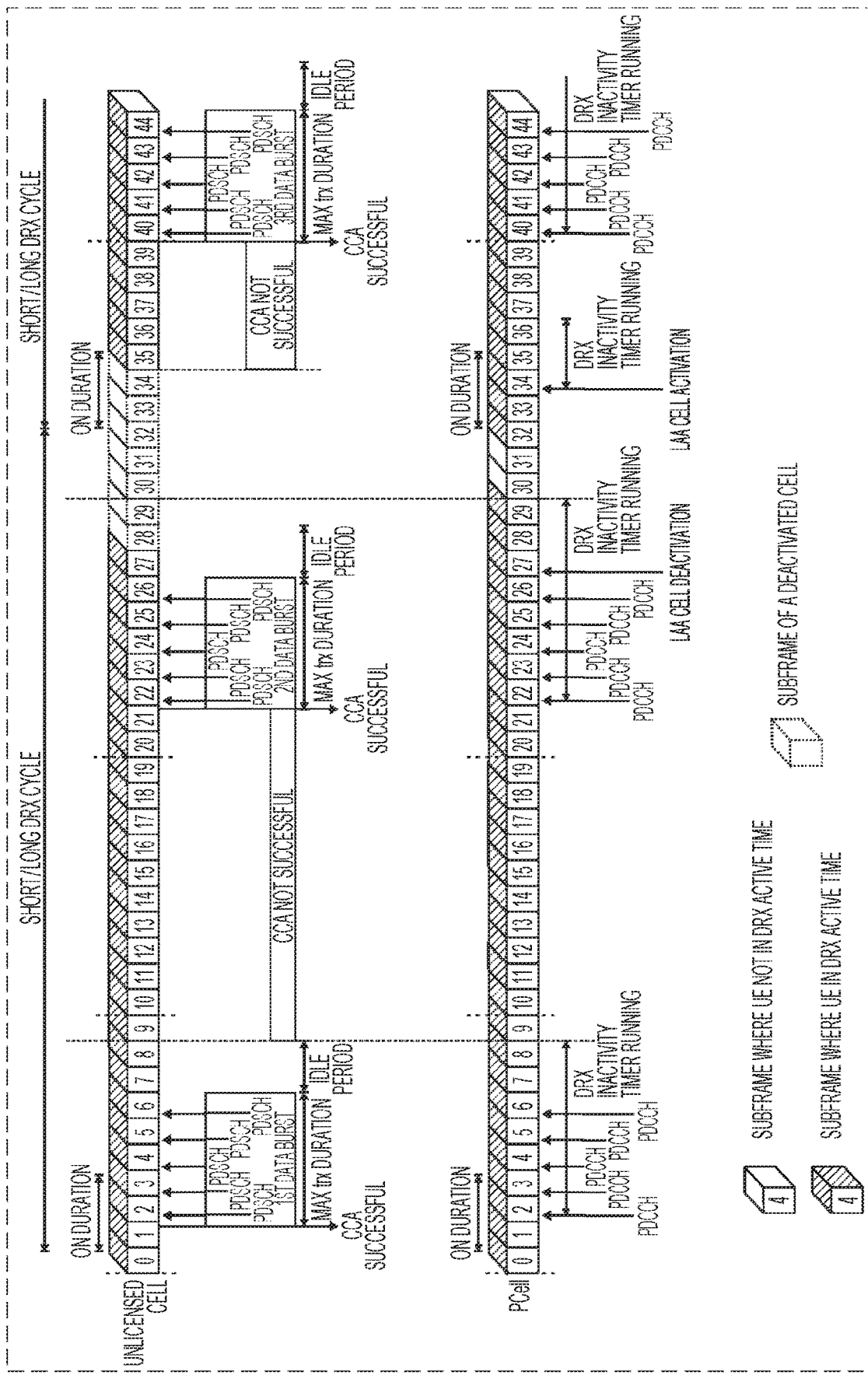
FIG. 8 illustrates schematically an enhanced DRX operation and the timing of corresponding downlink transmissions via the unlicensed cell according to a further embodiment.

FIG. 8 illustrates in said respect that, although the DRX Inactivity Timer expires, the UE is still in DRX Active Time in subframes 9, 10, 11, etc. Correspondingly, in all subframes in which the unlicensed cell is activated, the UE is in DRX Active Time on all configured/aggregated/activated cells (here PCell, and the one unlicensed cell; common DRX is assumed). Therefore, the eNB is able to send the 2nd data burst as soon as LBT/CCA is performed by the eNodeB successfully (exemplary be assumed to take place in subframe 21 in a similar manner as already explained in connection with FIG. 7).

It is then assumed that no further data is to be transmitted, and, for power saving purposes, the eNB decides to deactivate the unlicensed cell by transmitting a corresponding deactivation instruction (in FIG. 8 termed exemplarily LAA cell deactivation) to the UE (e.g., via the PCell) (e.g., the above-mentioned MAC CE). In the exemplary scenario of FIG. 8, it is assumed that this is done in subframe 27, such that the unlicensed cell is deactivated as of subframe 28 (neglecting here any signaling and process delay typically involved in the activation/deactivation procedure for illustration purposes); the inactive subframes of the unlicensed cell are shown with dotted-lined subframe boxes in FIG. 8). Due to the deactivated unlicensed cell, the UE is not in DRX Active Time on the PCell in subframes 30 and 31 (DRX Inactivity Timer restarted by the LAA cell deactivation expires in subframe 29). According to the normal DRX operation, the periodical DRX On-Duration period causes the UE to be in DRX Active Time in subframes 32-34 on the PCell.

In the exemplary scenario of FIG. 8, it is further assumed that the eNB decides to activate the unlicensed cell again (e.g., because downlink data is to be transmitted, and the unlicensed cell shall be used in said respect to not cause load on the PCell). Correspondingly, the eNB uses the last subframe 34 of the On-Duration period to transmit a suitable cell activation command to the UE (via the PCell), such that the unlicensed cell is again activated as of subframe 35 (again, it is assumed for illustration purposes that there is no activation delay caused by signaling and processing). Consequently, the UE is in DRX Active Time as of subframe 35 on the PCell and the unlicensed cell, independently from expiry of the DRX Inactivity Timer (and other DRX Active Time conditions, such as HARQ RTT timer, SR pending, etc). In subframes 35 and 36, the UE would have been in DRX Active Time also due to the running DRX inactivity timer, but as of subframe 36, the DRX-active instruction ensures that the UE is in DRX Active Time too.

As soon as the unlicensed cell is determined to be not occupied (i.e., LBT/CCA by eNB is successful), the eNB may perform a corresponding downlink transmission on the unlicensed cell, here are assumed to take place in subframes 40-44 (including corresponding PDCCHs on the PCell and PDSCHs on the unlicensed cell).

When assuming a particular implementation in the 3GPP environment, particularly as described in the background section, one exemplary implementation of the embodiment can foresee an additional condition for the UE to check whether a particular subframe shall be DRX Active Time or not. In particular, currently the 3GPP technical standard 36.321, current version 12.5.0, defines in section 5.7 several conditions:

When a DRX cycle is configured, the Active Time includes the time while:
   onDurationTimer or drx-InactivityTimer or drx-RetransmissionTimer or mac-ContentionResolutionTimer (as described in subclause 5.1.5) is running; or
   a Scheduling Request is sent on PUCCH and is pending (as described in subclause 5.4.4); or
   an uplink grant for a pending HARQ retransmission can occur and there is data in the corresponding HARQ buffer; or
   a PDCCH indicating a new transmission addressed to the C-RNTI of the MAC entity has not been received after successful reception of a Random Access Response for the preamble not selected by the MAC entity (as described in subclause 5.1.4).

According to this exemplary implementation of the solution, the following additional condition could be foreseen:
   When a DRX cycle is configured, the Active Time includes the time while an unlicensed serving cell (SCell) is activated.

Of course, the formulation of the condition chosen above is merely an example and other suitable formulations/terminology could be equally used in said respect. Consequently, a UE operating according to DRX shall additionally check in each subframe whether an aggregated unlicensed cell is activated, and, if so, to be in DRX Active Time in said subframe, which entails performing actions as specific for DRX Active Time (see also TS 36.321, section 5.7 for details).

A further implementation of this embodiment considers the operation of a cell deactivation timer that can be configured in a UE and which is a timer that, upon expiry, triggers a corresponding cell to be deactivated. As defined in the current 3GPP specification TS 36.321 v12.5.0, subclause 5.13, incorporated herein by reference, an sCellDeactivationTimer can be running, where the UE shall deactivate the SCell upon its expiry. While the PCell cannot be deactivated by such a timer, this may well be the case for any of the other (un)licensed cells with which the UE is configured. As explained above, the present solution provides a DRX operation which is based on an activation/deactivation status of the unlicensed cell. Furthermore, for power saving purposes the eNodeB may explicitly activate and deactivate the unlicensed cell via a command so as to influence the DRX operation on the remaining cells configured for the UE (assuming common DRX). In parallel however, the cell deactivation timer may be running in the UE for each serving cell and may thus cause the unlicensed cell to be deactivated although it should remain activated so as to be able to receive the next downlink transmission from the eNodeB. According to this exemplary implementation, the function of the cell deactivation timer can be ignored in said respect, and deactivation activation of the SCells shall be controlled by corresponding explicit activation/deactivation commands from the eNodeB.

Still another embodiment which solves the above-described problem is similar to the previous embodiment explained in connection with FIG. 8 in that the DRX Active Time is again implicitly controlled by the activation/deactivation status of the unlicensed cell. However, the difference is that for the present embodiment a separate DRX operation is assumed, instead of the common DRX operation assumed so far. In particular, although at present common DRX operation on all aggregated and configured carriers of a UE is agreed in 3GPP, this may change in the future, such that a common DRX operation for all cells configured for a UE is no longer required. Correspondingly, depending on the actual implementation and UE configuration, different carriers of a UE could be operated with a different DRX function, meaning that the UE could (not necessarily would) be in DRX Active Time in different subframes for different carriers. For explaining this solution, reference is made also to FIG. 9 which is an exemplary schematic illustration where a UE with three configured cells is assumed: a PCell, an unlicensed cell, and one SCell. It should be noted that the unlicensed cell could be basically also treated as an SCell. Cross-scheduling is still assumed such that the scheduling for the unlicensed cell is received via the PCell; the PCell can thus be termed exemplarily the "scheduling cell" of the unlicensed cell.

According to this solution, the DRX function for the PCell (as the scheduling cell of the unlicensed cell) and the unlicensed cell are operated in common by the UE; i.e., a common DRX for the PCell and unlicensed cell is used by the UE. On the other hand, the DRX operation on the SCell (and any other licensed cell, if configured for the UE) is separate from the common DRX of the PCell and unlicensed cell.

Figure 9:
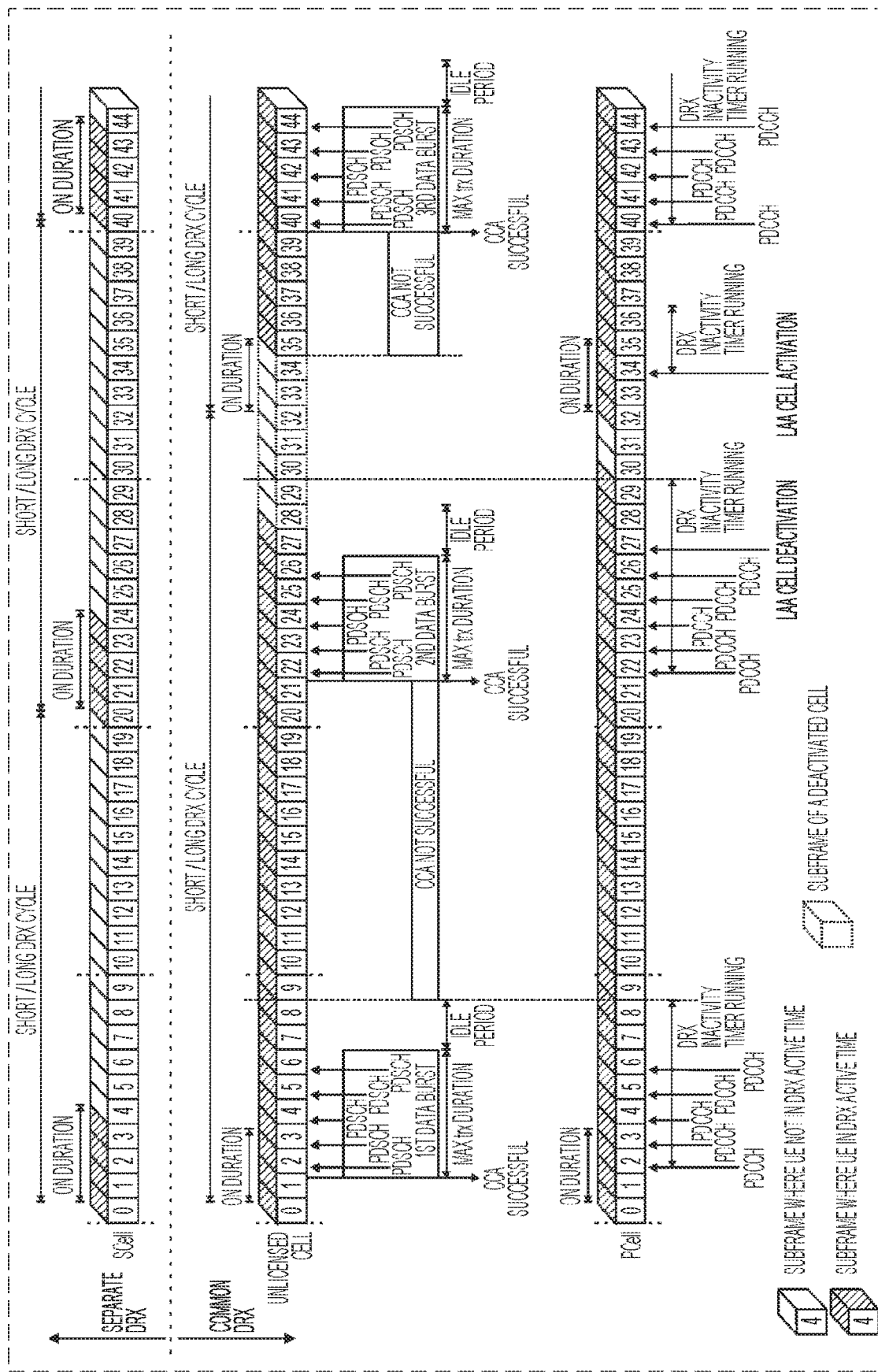
FIG. 9 illustrates schematically an enhanced DRX operation and the timing of corresponding downlink transmissions via the unlicensed cell according to a further embodiment.

Correspondingly, the DRX operation for the PCell and the unlicensed cell can be basically the same as explained for the previous solution, exemplary as illustrated in FIG. 8, as can be seen from FIG. 9.

On the other hand, the DRX operation for the SCell is not affected/changed by the common DRX operation on the PCell and unlicensed cell, since it is separate therefrom. In the exemplary scenario of FIG. 9, the DRX operation for the SCell is not only separate but is also operated with different parameters, in this case a DRX On-Duration of 4 subframes and a Short/Long DRX cycle of 20 ms. Of course, other parameters or exactly the same parameters as for the common DRX could be chosen as well. Further, the DRX parameters could be UE-specific (i.e., the same for all carriers) even though no common DRX operation would be performed. In the exemplary scenario of FIG. 9, the DRX operation follows the DRX cycle for the SCell such that the UE is on the SCell in DRX Active Time at least according to the DRX On-Duration periods in subframes 0-3, 20-23, and 40-43.

In the exemplary scenario of FIG. 9, cross scheduling of the unlicensed cell from the PCell was assumed. In case the UE receives the PDCCH destined for the unlicensed cell via the unlicensed cell itself (i.e., a self-scheduling scenario) and not via the PCell, the DRX operation on the unlicensed cell would be separate from the DRX operation of the remaining cells (i.e., the PCell and the SCell, and optionally also from other unlicensed cells if configured for the UE), the remaining cells in turn could or could not be operated in common. According to one additional embodiment of the present disclosure, there would be two DRX operations running in the UE, i.e., one for the common DRX operation for all unlicensed cells and one common DRX operation across all aggregated licensed cells. Correspondingly, the UE would be in DRX Active Time on the unlicensed cell in all subframes where at least one unlicensed cell is activated (in the same manner as for the cross-scheduling case discussed before). As before, the eNB can deactivate/activate an unlicensed cell as necessary to save power and thus to avoid that the UE is always in DRX Active Time.

On the other hand, since the DRX operations on the PCell and the SCell are separate from the one on the unlicensed cell(s), the UE would follow the normal DRX pattern(s) as configured for the PCell and the SCell independently from the activation/deactivation status of the unlicensed cell.

A further solution to the above described problem according to the following exemplary embodiment(s) will be presented in detail in the following. These exemplary embodiments will be described so as to highlight the underlying principles and shall thus not be understood as limiting the present disclosure. As before, to facilitate illustration, various assumptions are made, which however should be regarded as not restricting the present disclosure. As before, it is assumed that a UE is already set up and configured with several cells, at least one licensed cell (e.g., the PCell) and at least one unlicensed cell. First, common DRX operation on all aggregated and activated cells configured for a UE is assumed as currently agreed on in 3GPP, the common DRX being operated by the UE on each and every of its configured cells, the DRX operation entailing a short and/or long DRX cycle, corresponding On-Duration periods, etc. For one specific implementation of this embodiment to be used in combination with the currently-standardized 3GPP LTE environment, reference is made to the corresponding passages of the background section relating to DRX for more details on how the "normal" DRX operation works. As such, the DRX-Active instruction and corresponding consequences can be seen as an enhancement to said normal DRX operation so as to take into account the special circumstances of scenarios where unlicensed cells are involved.

This embodiment is based on the transmission of an appropriate DRX command such that the UE is continuously in DRX Active Time until receiving the next PDCCH for a downlink transmission to be performed via the unlicensed cell. In particular, the DRX command (termed exemplarily DRX-Active instruction in the following) is transmitted from the eNB to the UE such that the UE is in DRX Active Time until the eNodeB is able to perform the next downlink transmission on the unlicensed cell, i.e., comprising performing successfully the LBT/CCA, transmitting the corresponding PDCCH (on the PCell, if cross-scheduling via PCell is configured) and transmitting the corresponding PDSCH on the unlicensed cell. After receiving said next PDCCH for the downlink transmission to be performed via the unlicensed cell, the UE may continue with the "normal" DRX operation and thus may continue with the currently-configured DRX cycle.

This embodiment has the advantage that only one DRX-Active instruction is necessary so as to keep the mobile terminal in DRX Active Time as long as necessary (compared to the previous embodiment explained in connection with FIG. 7). It should be noted that also after receiving the DRX-Active instruction, the UE continues with the normal DRX operation too; the DRX-Active instruction adds a further layer to the normal DRX operation to deal with LAA scenarios by putting the UE in DRX Active Time in more subframes, as will become clearer in the following.

Figure 10:
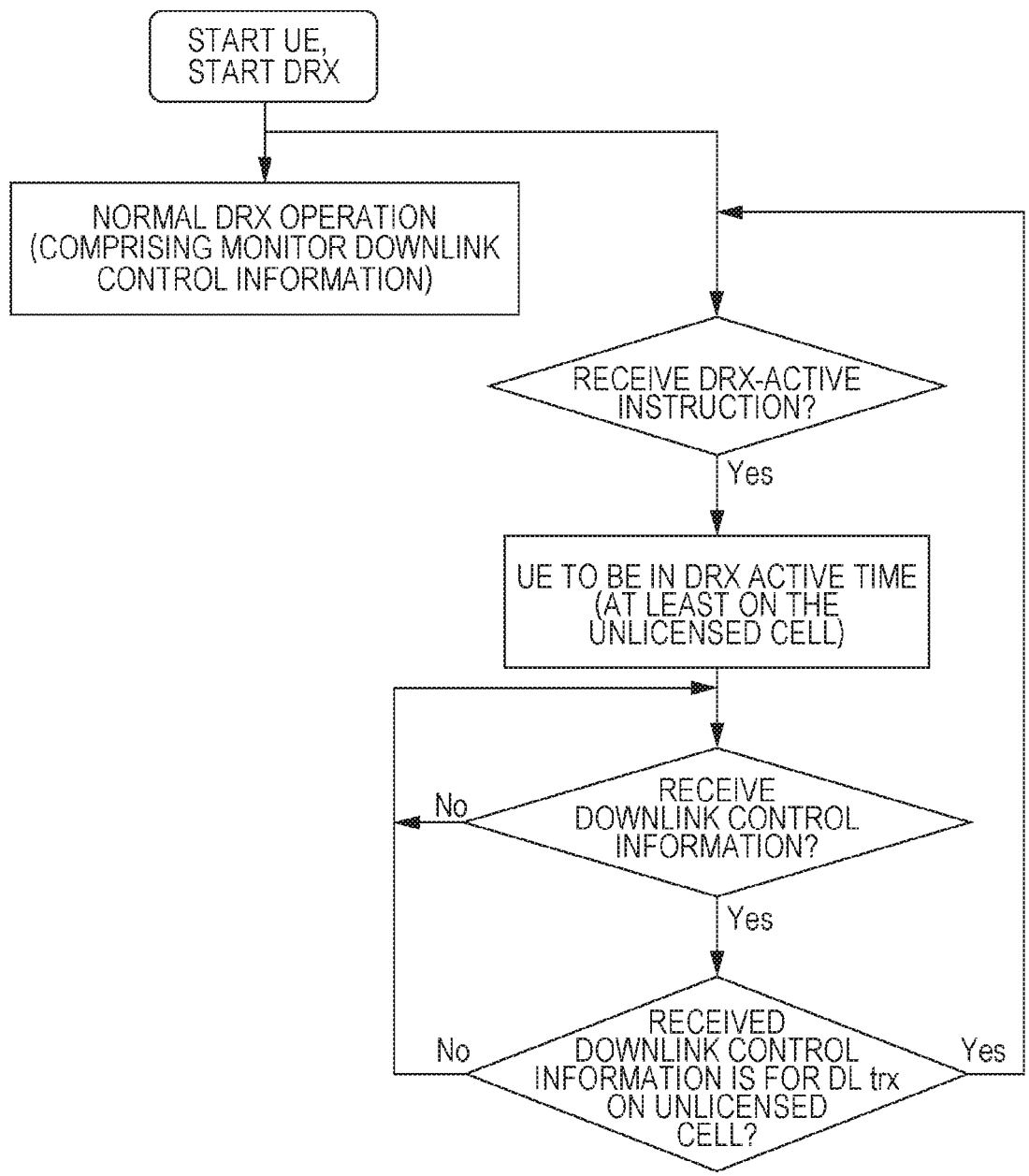
FIG. 10 is a sequence diagram for the enhanced DRX operation in a UE according to a further embodiment.

A very basic schematic sequence diagram for the UE DRX operation is illustrated in FIG. 10. As apparent therefrom, it is assumed that the UE starts the "normal" DRX operation, and continues operating according to same in parallel also after receiving a DRX-Active instruction (this means that the short/long DRX cycle is operated, DRX-related timers are started/restarted/expired as already defined, the UE is in DRX Active Time in the On-Duration periods, etc). Then, after reception of such a DRX-Active instruction, the UE shall be continuously in DRX Active Time at least on the unlicensed cell (and assuming common DRX, basically on all aggregated cells configured for the UE) for a specific period of time. The UE is monitoring the PDCCH. In case the UE receives a downlink control information, i.e., PDDCH, it will have to further determine whether same relates to a downlink transmission via the unlicensed cell or not. If yes, the UE stopped operating DRX according to the DRX active instruction (basically always in DRX Active Time) and may continue operating according to normal DRX, thus being in DRX Active Time or not, depending on the normal DRX short/long cycle which is running all the time in parallel, e.g., drx-related timers are started/restarted/expiring as defined in current specification. Therefore, this DRX-Active instruction is basically defining a new additional Active Time condition on top of the currently-defined DRX procedure/Active Time conditions. Upon reception of the DRX-Active instruction (signaling), the UE is in DRX Active Time at least until it is stopped by the reception of a downlink control information assigning downlink resources on the unlicensed cell.

Figure 11:
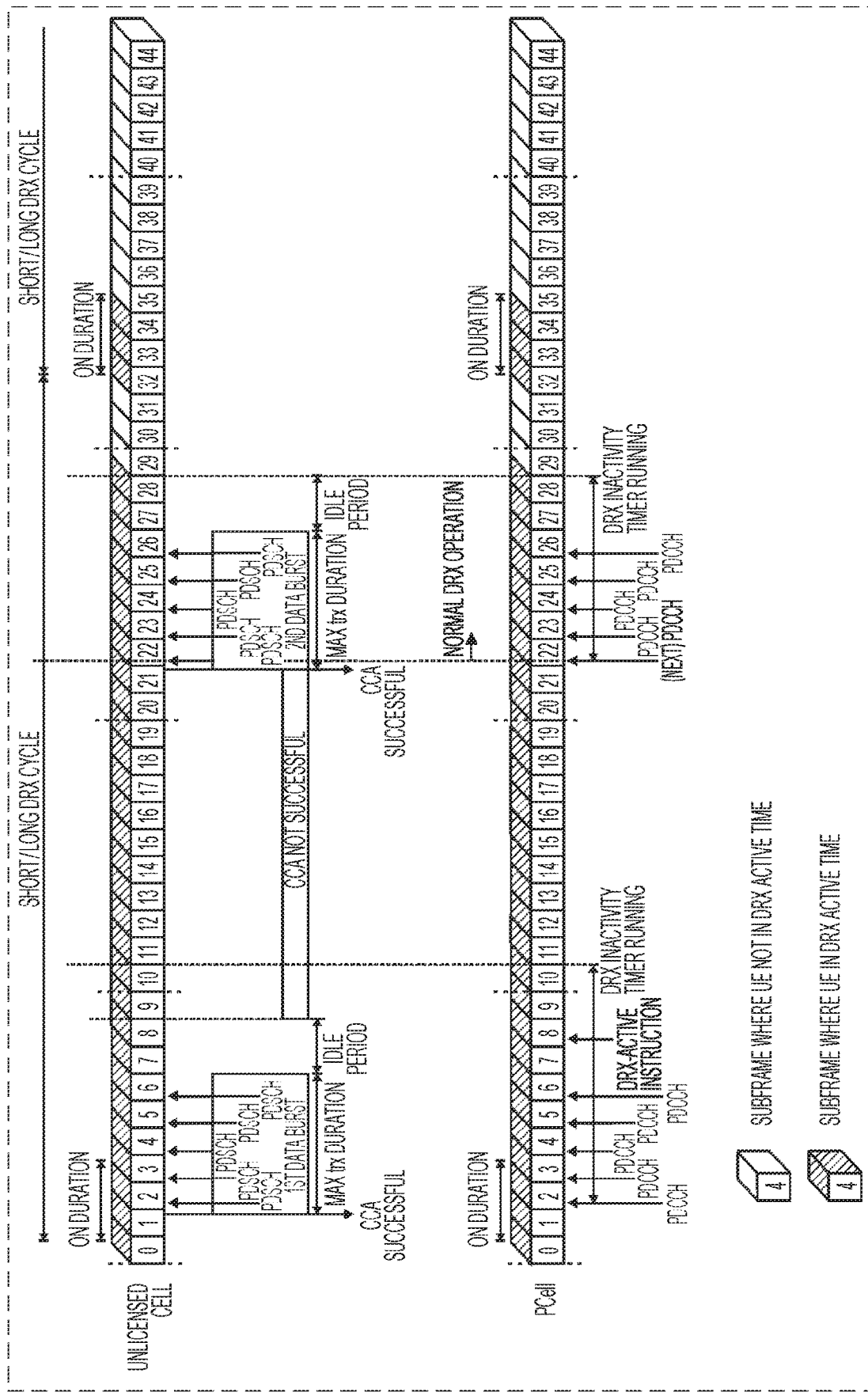
FIG. 11 illustrates schematically an enhanced DRX operation and the timing of corresponding downlink transmissions via the unlicensed cell according to the embodiment discussed in FIG. 10.

FIG. 11 is a schematic illustration of the DRX operation for a UE configured with two cells, where a similar scenario is assumed as for explaining the previous embodiments. As can be appreciated from FIG. 11, a DRX-Active instruction is transmitted in subframe 8 (before expiry of the DRX Inactivity Timer, restarted by the last PDCCH of the 1st data burst); the DRX-Active instruction is assumed here to also restart the DRX Inactivity Timer, e.g., when the DRX-Active instruction is implemented as a PDCCH, see later. According to the exemplary implementation of FIG. 11, immediately upon receiving the DRX active instruction, the UE will operate DRX so as to be in DRX Active Time irrespective of any of the other DRX Active Time conditions (e.g., after expiry of the DRX Inactivity Timer at subframe 10). For illustrative purposes, any signaling and processing delay for the DRX-Active instruction is neglected here.

This will be done until receiving the next PDCCH for scheduling a downlink transmission on the unlicensed cell, which is assumed in this case to take place in subframe 22. Correspondingly, upon receiving said next PDCCH, the UE will continue operating according to the "normal" (i.e., as currently specified) DRX operation, which will include that the UE will be in DRX Active Time in the subframes 22-28 since the DRX inactivity timer is running as started by the first PDCCH in subframe 22 and restarted by the PDCCHs in the subsequent subframes. Following the normal DRX operation, the UE will not be in DRX Active Time during subframes 29, 30 and 31, while again being in DRX Active Time during the On-Duration subframes 32-34, and so on.

So far it was assumed that the UE, upon reception of the DRX-Active instruction, as soon as possible adheres to the instruction by being in DRX Active Time. In other words, the UE, immediately upon reception and processing of the DRX-Active instruction, operates to be in DRX Active Time. Alternatively, the UE may not immediately operate to be in DRX Active Time upon reception and processing of the DRX-Active instruction, but may rather delay the execution of the DRX-Active instruction for some time. Thus, during the delay (i.e., after receiving the DRX active instruction but before its execution), the UE continues to operate the normal DRX. The delay could be, e.g., predetermined or may be separately instructed to the UE (e.g., also within the DRX-Active instruction itself). For example, when assuming the implementation where the MAC control element carries the DRX-Active instruction (see later), the MAC control element may also carry in a corresponding field information (e.g., 8 bits) allowing the UE to determine the delay/offset. For example, the delay could be indicated directly as the number of subframes the UE should wait until executing the DRX-Active instruction after its reception. Alternatively, the delay could be indicated as the number of subframes before the starting subframe of the next On-Duration period of the DRX function, which has the advantage that the subframe at which the UE shall execute the DRX-Active instruction is unambiguous and not dependent on the reception (and/or successful decoding) point in time (which is the case where the delay is directly indicated as the number of subframes to wait).

Delaying the execution of the DRX active instruction in the UE can be particularly advantageous in those cases where the eNodeB can predict (for example based on some collected statistics regarding the channel accessibility of the unlicensed cell) the channel occupation and thus can predict when the next transmission opportunity would (likely) be available on the unlicensed cell. Correspondingly, instead of being in DRX Active Time as of receiving the DRX-Active instruction, the delay will achieve that the UE is not in DRX Active Time at the beginning, but only after the delay, and thus power can be saved.

Figure 12:
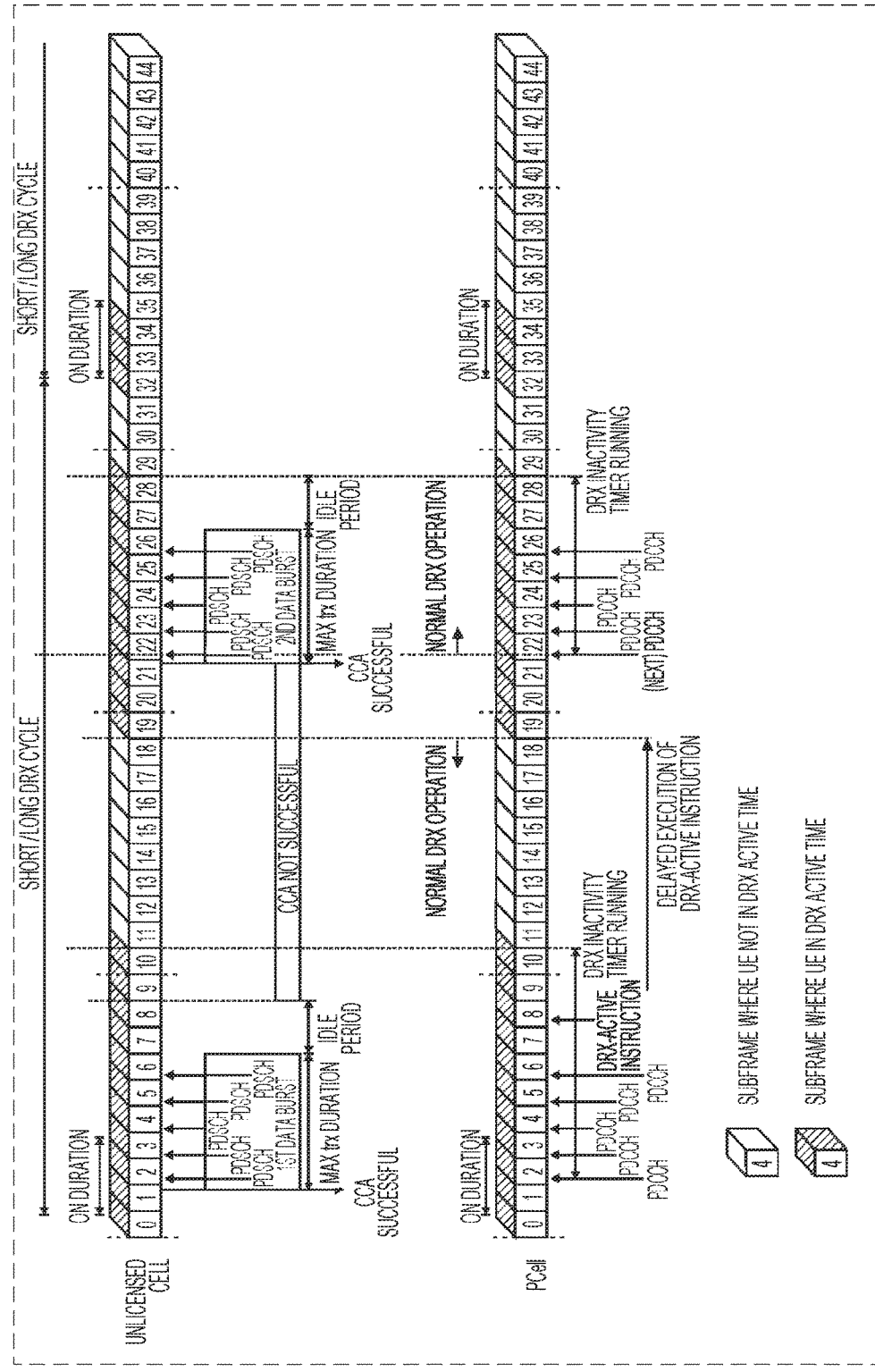
FIG. 12 illustrates schematically an enhanced DRX operation and the timing of corresponding downlink transmissions via the unlicensed cell according to a variation of the embodiment discussed in FIGS. 10 and 11.

This embodiment where the DRX active instruction is delayed is exemplarily illustrated in FIG. 12. When comparing same to FIG. 11, the execution of the DRX-active instruction is effectively delayed for 10 subframes, such that the UE operates according to normal DRX until subframe 18. Then, upon executing the DRX-Active instruction after the delay at subframe 19, the UE is in DRX Active Time in subframes 19-21 due to said DRX-Active instruction. Upon receiving the next PDCCH in subframe 22, normal DRX operation is resumed by the UE, which entails to be in DRX Active Time due to the DRX Inactivity Timer running.

According to one implementation of this embodiment, the DRX-Active instruction is a MAC control element, defined specifically for said purpose. For example, one of the reserved logical channel ID can be used for identifying such a new DRX MAC control element. As apparent from the current 3GPP specification TS 36.321, current version 12.5.0, subclause 6.2.1, incorporated herein by reference, Table 6.2.1-1 gives values of the Logical Channel ID (LCID) for the Downlink Shared channel, where values 01011-11001 are reserved. In order to identify a MAC control element as the new DRX active instruction, one of the reserved LCID values could be used, such as 11001. The table could in this exemplary case be as follows:

| Index | LCID values |
|---|---|
| 00000 | CCCH |
| 00001-01010 | Identity of the logical channel |
| 01011-11000 | Reserved |
| 11001 | DRX-Active instruction |
| 11010 | Long DRX command |
| 11011 | Activation/Deactivation |
| 11100 | UE Contention Resolution Identity |
| 11101 | Timing Advance Command |
| 11110 | DRX Command |
| 11111 | Padding |

Of course, other reserved LCID values could be used in said respect. Correspondingly, the MAC PDU subheader of the MAC control element will include the specific LCID value to identify the new DRX-Active instruction. The MAC CE itself may have a fixed size of 0 bits.

According to an alternative implementation of this embodiment, PDCCH signaling is used instead of MAC signaling to convey the DRX-Active instruction. In particular, any of the available DCI formats can be used to transport the DRX-Active instruction. In one example, the so-called "PDCCH order" of DCI Format 1A can be used to convey this message. In particular, as defined in subclause 5.3.3.1.3 "Format 1A" of the 3GPP specification TS 36.212 current version 12.4.0, incorporated herein by reference, "a PDCCH order can be carried by the PDCCH or EPDCCH" for the purpose of initiating a random access procedure. Such a PDCCH order to initiate RACH of DCI Format 1A is very specific:

Format 1A is used for random access procedure initiated by a PDCCH order only if format 1A CRC is scrambled with C-RNTI and all the remaining fields are set as follows:
Localized/Distributed VRB assignment flag—1 bit is set to '0'
Resource block assignment—bits, where all bits shall be set to 1
Preamble Index—6 bits
PRACH Mask Index—4 bits, [5]
All the remaining bits in format 1A for compact scheduling assignment of one PDSCH codeword are set to zero Correspondingly, such a PDCCH order, when carrying the identification of the unlicensed cell in the corresponding carrier indicator field, could be used to convey the DRX-Active instruction. In other words, an PDCCH (DCI Format 1A), normally instructing to initiate a RACH procedure, will, in case the CIF carries the ID of the unlicensed cell, be interpreted by the UE as the DRX-Active instruction, and the UE will thus be in DRX Active Time until receiving the next PDCCH scheduling a downlink transmission on the unlicensed cell.

This has the advantage that the PDCCH order which is already defined in the standard can be reused as a DRX-Active command. It should be noted that the assumption here is that a PDCCH order will not be used for unlicensed cells, since random access on an unlicensed cell is not necessary. Normally, the PDCCH-ordered random access is used in order to synchronize the uplink timing of the UE. However, for the case of LAA, respectively for unlicensed cells, the synchronization might be not necessary at all or done by other means.

Of course, there are other ways to convey the DRX-Active command as a PDCCH. In particular, some bits of any other existing DCI may be redefined for said purpose. In this case, there needs to be some predefined codepoint(s) of at least one of the field conveyed within this DCI or a combination of predefined codepoints of several fields which indicates that remaining bits within the DCI are interpreted differently, i.e., indicating the DRX-active instruction or the number of subframes the UE shall wait before executing the DRX-active instruction. According to yet another implementation a new DCI could be introduced which indicates the DRX-active instruction. This new DCI could be of very short size; however introducing a new DCI would come at the cost of an increased blind decoding effort required for the UE.

When assuming a particular implementation in the 3GPP environment, particularly as described in the background section, one exemplary implementation of the solution can foresee an additional condition for the UE to check whether a particular subframe shall be DRX Active Time or not. In particular, currently the 3GPP technical standard 36.321, current version 12.5.0, defines in section 5.7 several conditions which could be extended by the following additional condition:

When a DRX cycle is configured, the Active Time includes the time while a PDCCH for scheduling PDSCH on an unlicensed cell has not been received after successful reception of a DRX-Active instruction According to one specific implementation of the embodiment, the above discussed condition of operating according to the DRX-Active instruction until the reception of the next PDCCH scheduling a downlink transmission via the unlicensed cell, could be implemented by use of a suitable timer. In particular, a new timer, e.g., termed LAA-related DRX timer, could be started upon reception of the DRX-Active instruction, and will be stopped by the reception of said PDCCH scheduling a downlink transmission on the unlicensed cell. Correspondingly, the UE shall be in DRX Active Time as long as the LAA-related DRX timer is running. The value of the timer can be chosen such that it is guaranteed that the UE is still in DRX Active Time when the next transmission on the unlicensed cell occurs. For example, the value of the LAA-related DRX timer can be larger than the short/long DRX cycle.

When assuming a particular implementation in the 3GPP environment, particularly as described in the background section, one exemplary implementation of the solution can foresee an additional condition for the UE to check whether a particular subframe shall be DRX Active Time or not. In particular, currently the 3GPP technical standard 36.321, current version 12.5.0, defines in section 5.7 several conditions which could be extended by the following additional condition:

When a DRX cycle is configured, the Active Time includes the time while the LAA-related DRX timer is running The implementation as a timer has the additional advantage that there is a maximum time period that the UE is in DRX Active Time upon reception of the DRX active instruction. Put differently, in case no PDCCH scheduling a PDSCH on the unlicensed cell is received by the UE, the timer makes sure that the UE is not in DRX Active Time indefinitely, but only until the timer expires.

According to a specific implementation of the embodiment, in order to allow the eNodeB to "abort" (i.e., exit) the UE to operate according to the DRX-Active instruction, the eNodeB may transmit a corresponding instruction for the UE to resume the normal DRX operation and thus to exit the DRX operation according to the DRX active instruction. In other words, such an abort instruction shall be understood by the UE as an instruction to enter normal DRX operation. For example, the DRX MAC control elements already defined in the standardization can be reused in said respect, particularly the DRX MAC control element and the long DRX MAC control element as defined in 3GPP TS 36.321, current version 12.5.0, at least subclauses 5.7 and 6.1.3.9 being incorporated herein by reference. Correspondingly, upon reception of a DRX-Active instruction, the UE is continuously in DRX Active Time until the UE either receives a PDCCH scheduling a downlink transmission on the unlicensed cell or until it receives a corresponding DRX-Active exit instruction (such as the Long DRX MAC CE).

When the embodiment is implemented as a timer, e.g., the LAA-related DRX timer mentioned above, this timer shall be stopped when receiving the next PDCCH scheduling the downlink transmission on the unlicensed cell, but also when receiving a DRX-Active exit instruction (e.g., the DRX MAC CE or Long DRX MAC CE) as discussed above.

One specific implementation of this embodiment also considers the operation of the cell deactivation timer that can be configured in a UE, which is a timer that, upon expiry, triggers a corresponding cell to be deactivated. As mentioned before, the current 3GPP specification TS 36.321 v12.5.0, subclause 5.13, defines an sCellDeactivationTimer which can be running for an SCell, where the UE shall deactivate the SCell upon its expiry. While the PCell cannot be deactivated by such a timer, this may well be the case for any of the other (un)licensed cells with which the UE is configured. The cell deactivation timer can be running in the UE for each serving cell (Scell) and may thus cause the unlicensed cell to be deactivated although it should remain activated so as to be able to receive the next downlink transmission from the eNodeB. According to this specific implementation, the function of the cell deactivation timer can be ignored in said respect (deactivation/activation of the SCells can still be controlled by corresponding explicit activation/deactivation commands from the eNodeB). Furthermore, in case the cell via which the unlicensed cell is scheduled is not the PCell, but, e.g., another licensed Scell, this other licensed SCell shall also not be deactivated by the cell deactivation timer, and thus the function of the cell deactivation timer shall be ignored in said respect too.

So far, a common DRX operation has been assumed for this embodiment. However, the principles underlying this embodiment can be also applied to scenarios where separate DRX operation is implemented. In particular, the DRX-Active instruction could for example be only applied by the UE to the common DRX operation on the respective unlicensed cell(s) and the corresponding scheduling cells (i.e., those cells carrying the scheduling information for the unlicensed cells, if cross scheduling is configured). On the other hand, the UE would continue separately with the normal DRX operation on other serving cells, which DRX operation is separate from the (common) DRX operation of the unlicensed cell (and scheduling cell, in case of cross-scheduling).

In the following, an improvement to the various previous embodiments will be presented, which can be used in combination with each of them. According to this improvement, the UE would in addition be able to autonomously control the DRX Active Time for an unlicensed cell, so as to decide whether it is indeed in DRX Active Time or not. In particular, the UE could in this case monitor the traffic on the unlicensed cell. In case it detects a transmission from another eNB or some Wifi node on the unlicensed cell, it would know that the channel is occupied (assuming that this would also be the case for the eNB), the UE would not need to monitor the unlicensed cell/carrier for a control channel or data transmission from its own serving eNB (the eNB the UE has established an RRC connection with). Put in other words, the UE does not need to be in DRX Active Time as long as the unlicensed channel is utilized by some other node, since CCA executed by its own serving eNB would not be successful in this case.

In one specific implementation of this improvement, the UE could in said respect make use of information on the length of the channel occupancy time. As already the case for Wifi transmissions, the duration of a transmission burst (the channel occupancy time) is signaled at the beginning of the burst. Furthermore, according to some exemplary embodiments, the duration of a transmission burst performed by an eNodeB, i.e., channel occupancy time, could also be signaled in the beginning, e.g., in the first symbols of a transmission burst. With this information, a UE would be aware for how long it would not need to monitor for signaling (control information or data) from its own serving eNB and could hence optimize the power consumption. One assumption in this embodiment is that the UE is capable of receiving and decoding transmission from other nodes, i.e., other eNB or Wifi nodes, on the unlicensed cell.

Further Embodiments

According to a first aspect, a method is provided for operating a Discontinuous Reception, DRX, function at a user equipment. The user equipment is configured with at least one licensed cell and at least one unlicensed cell and operates the DRX function. The method comprises the following steps performed by the user equipment. The UE receives, from a radio base station, a DRX-active instruction to be in DRX Active Time at least on the unlicensed cell until receiving the next downlink control information related to a downlink data transmission to be received via the unlicensed cell. In response to the received DRX-active instruction, the UE is in DRX Active Time at least on the unlicensed cell, comprising continuously monitoring a downlink control channel for downlink control information. According to an advantageous variant of the first aspect which can be used in addition to the above, upon receiving said next downlink control information, the user equipment continues operating the DRX function, comprising being in DRX Active Time for an On-Duration of time and being not in DRX Active Time, according to a long or short DRX cycle of the DRX function.

According to an advantageous variant of the first aspect which can be used in addition to the above, a scheduling cell, being the cell on which downlink control information related to the downlink data transmission to be received via the unlicensed cell is received by the user equipment, is either the unlicensed cell, another unlicensed cell, or a licensed cell.

According to an advantageous variant of the first aspect which can be used in addition to the above, the DRX function is operated in common for the at least one licensed cell and the at least one unlicensed cell, comprising being in DRX Active Time and being not in DRX Active Time on the at least one licensed cell and the at least one unlicensed cell at the same time according to the common DRX function.

According to an advantageous variant of the first aspect which can be used in addition to the above, upon reception of the DRX-active instruction, an unlicensed cell active timer is started. The user equipment is in DRX Active Time at least on the unlicensed cell while the unlicensed cell active timer is running. The unlicensed cell active timer is stopped upon reception of said next downlink control information related to the downlink data transmission to be received via the unlicensed cell. Optionally, the unlicensed cell active timer is stopped upon reception of a DRX instruction to become non-active, for example a DRX instruction to enter a short DRX cycle or to enter a long DRX cycle.

According to an advantageous variant of the first aspect which can be used in addition to the above, the DRX-active instruction is comprised in a control element of a Medium Access Control, MAC, protocol. Optionally, the MAC control element comprises a predetermined identification value indicating the MAC control element to be the DRX-active instruction.

According to an alternative variant of the first aspect to the above, the DRX-active instruction is comprised in downlink control information, DCI, transmitted on the downlink control channel. Optionally, the DCI is of the 3GPP DCI Format 1A and comprises information such that the DCI:
- is processed by a user equipment as an instruction to perform a random access procedure on a licensed cell when comprising an identification of this licensed cell, and
- is processed by a user equipment as the DRX-active instruction when comprising an identification of the unlicensed cell.

According to an advantageous variant of the first aspect which can be used in addition to the above, the user equipment follows the DRX-active instruction either immediately upon reception of the DRX-active instruction. Or, the user equipment follows the DRX-active instruction after a particular time period upon reception of the DRX-active instruction. Optionally, the particular time period is determined by the user equipment based on information comprised in the DRX-active instruction, which for example indicates a number of subframes before the starting subframe of the next On-Duration period of the DRX function.

According to an advantageous variant of the first aspect which can be used in addition to the above, at least a scheduling cell, on which downlink control information related to the downlink data transmission to be received via the unlicensed cell is received, and the unlicensed cell is not deactivated until receiving said next downlink control information. Optionally, the scheduling cell and the unlicensed cell are not deactivated upon expiry of a cell deactivation timer configured for the scheduling cell and the unlicensed cell or upon reception of a cell deactivation instruction from the radio base station for the scheduling cell and the unlicensed cell.

According to a second aspect, a method is provided for operating a Discontinuous Reception, DRX, function at a user equipment. The user equipment is configured with at least one licensed cell and at least one unlicensed cell and operates the DRX function. The user equipment is in DRX Active Time for the unlicensed cell for all subframes in which the unlicensed cell is activated such that the user equipment continuously monitors a downlink control channel associated with the unlicensed cell for all subframes in which the unlicensed cell is activated.

According to an advantageous variant of the second aspect which can be used in addition to the above, at least a scheduling cell, on which downlink control information related to a downlink data transmission to be received via the unlicensed cell is received, is not deactivated upon expiry of a cell deactivation timer configured for the scheduling cell. Optionally, the scheduling cell is deactivated upon reception of a cell deactivation instruction from the radio base station and is activated upon reception of a cell activation instruction from the radio base station.

According to an advantageous variant of the second aspect which can be used in addition to the above, the DRX function is operated in common for the at least one licensed cell and the at least one unlicensed cell, comprising being in DRX Active Time and being not in DRX Active Time on the at least one licensed cell and the at least one unlicensed cell at the same time according to the common DRX function such that the user equipment continuously monitors downlink control channels on the at least one licensed cell and on the at least one unlicensed cell at all subframes in which the unlicensed cell is activated.

According to an alternative variant of the second aspect which can be used in addition to the above, the DRX function is operated by the user equipment on the unlicensed cell and also on a scheduling cell in case downlink control information for the unlicensed cell is received via the scheduling cell, such that the user equipment monitors a downlink control channel associated with the unlicensed cell for all subframes in which the unlicensed cell is activated. The DRX function is separate from at least one further DRX function according to which the user equipment operates the at least one licensed cell, comprising being in DRX Active Time and being not in DRX Active Time on the at least one licensed cell according to the further DRX function.

According to a third aspect, a user equipment is provided for operating a Discontinuous Reception, DRX, function. The user equipment is configured with at least one licensed cell and at least one unlicensed cell and operates the DRX function. A receiver of the user equipment receives, from a radio base station, a DRX-active instruction to be in DRX Active Time at least on the unlicensed cell until receiving the next downlink control information related to a downlink data transmission to be received via the unlicensed cell. A processor of the user equipment controls the user equipment to be, in response to the received DRX-active instruction, in DRX Active Time at least on the unlicensed cell, comprising continuously monitoring a downlink control channel for downlink control information.

According to an advantageous variant of the third aspect which can be used in addition to the above, upon receiving said next downlink control information, the user equipment continues operating the DRX function, comprising being in DRX Active Time for an On-Duration of time and being not in DRX Active Time, according to a long or short DRX cycle of the DRX function.

According to an advantageous variant of the third aspect which can be used in addition to the above, upon reception of the DRX-active instruction, the processor starts an unlicensed cell active timer. The user equipment is in DRX Active Time at least on the unlicensed cell while the unlicensed cell active timer is running. The processor stops the unlicensed cell active timer upon reception of said next downlink control information related to the downlink data transmission to be received via the unlicensed cell. Optionally, the processor stops the unlicensed cell active timer upon reception of a DRX instruction to become non-active, for example a DRX instruction to enter a short DRX cycle or to enter a long DRX cycle.

According to an advantageous variant of the third aspect which can be used in addition to the above, the user equipment follows the DRX-active instruction either immediately upon reception of the DRX-active instruction. Or, the user equipment follows the DRX-active instruction after a particular time period upon reception of the DRX-active instruction. Optionally, the particular time period is determined by the user equipment based on information comprised in the DRX-active instruction, which for example indicates a number of subframes before the starting subframe of the next On-Duration period of the DRX function.

According to an advantageous variant of the third aspect which can be used in addition to the above, the user equipment does not deactivate at least a scheduling cell, on which downlink control information related to the downlink data transmission to be received via the unlicensed cell is received, and the unlicensed cell until receiving said next downlink control information. Optionally, the user equipment does not deactivate the scheduling cell and the unlicensed cell upon expiry of a cell deactivation timer configured for the scheduling cell and the unlicensed cell or upon reception of a cell deactivation instruction from the radio base station for the scheduling cell and the unlicensed cell.

According to a fourth aspect, a user equipment is provided for operating a Discontinuous Reception, DRX, function. The user equipment is configured with at least one licensed cell and at least one unlicensed cell and operates the DRX function. A processor of the user equipment controls the user equipment to be in DRX Active Time for the unlicensed cell for all subframes in which the unlicensed cell is activated such that the processor of the user equipment continuously monitors a downlink control channel associated with the unlicensed cell for all subframes in which the unlicensed cell is activated.

According to a fifth aspect, a radio base station is provided for controlling a Discontinuous Reception, DRX, function at a user equipment. The user equipment is configured with at least one licensed cell and at least one unlicensed cell and operates the DRX function.

A transmitter of the radio base station transmits, to the user equipment, a DRX-active instruction for the user equipment to be in DRX Active Time at least on the unlicensed cell until receiving the next downlink control information related to a downlink data transmission to be received via the unlicensed cell.

Hardware and Software Implementation of the Present Disclosure

Other exemplary embodiments relate to the implementation of the above described various embodiments using hardware, software, or software in cooperation with hardware. In this connection, a user terminal (mobile terminal) and an eNodeB (base station) are provided. The user terminal and base station are adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit which, in operation, controls of a process of a radio base station for controlling a Discontinuous Reception, DRX, function at a user equipment, wherein the user equipment is configured with at least one licensed cell and at least one unlicensed cell and operates the DRX function, the process comprising:

transmitting, to the user equipment, a DRX-active instruction for the user equipment to be in DRX Active Time at least on the unlicensed cell until receiving the next downlink control information related to a downlink data transmission to be received via the unlicensed cell, wherein the DRX-active instruction is included in a control element of a Medium Access Control, MAC, protocol, wherein the MAC control element comprises a predetermined identification value indicating that the MAC control element is the DRX-active instruction, wherein the DRX-active instruction is included in downlink control information, DCI, transmitted on a downlink control channel, and wherein the DCI is of the 3rd Generation Partnership Project, 3GPP, DCI Format 1A and comprises information such that the DCI:

is processed by the user equipment as an instruction to perform a random access procedure on a licensed cell when comprising an identification of this licensed cell, and is processed by the user equipment as the DRX-active instruction when comprising an identification of the unlicensed cell.

2. The integrated circuit according to claim 1, wherein at least a scheduling cell, on which downlink control information related to a downlink data transmission to be received via the unlicensed cell is transmitted, is not deactivated upon expiry of a cell deactivation timer configured for the scheduling cell, and wherein the scheduling cell is deactivated upon reception of a cell deactivation instruction from the radio base station and is activated upon reception of a cell activation instruction from the radio base station.

3. The integrated circuit according to claim 1, wherein the DRX function is operated in common for the at least one licensed cell and the at least one unlicensed cell, comprising being in DRX Active Time and being not in DRX Active Time on the at least one licensed cell and the at least one unlicensed cell at the same time according to the common DRX function such that the user equipment continuously monitors downlink control channels on the at least one licensed cell and on the at least one unlicensed cell at all of the subframes in which the unlicensed cell is activated.

4. The integrated circuit according to claim 1, wherein the DRX function is operated by the radio base station on the unlicensed cell and also on a scheduling cell in case downlink control information for the unlicensed cell is transmitted via the scheduling cell, such that the user equipment monitors the downlink control channel associated with the unlicensed cell for all of the subframes in which the unlicensed cell is activated, and wherein the DRX function is separate from at least one further DRX function according to which the radio base station operates the at least one licensed cell, comprising being in DRX Active Time and being not in DRX Active Time on the at least one licensed cell according to the further DRX function.

\* \* \* \* \*